Figure 1:
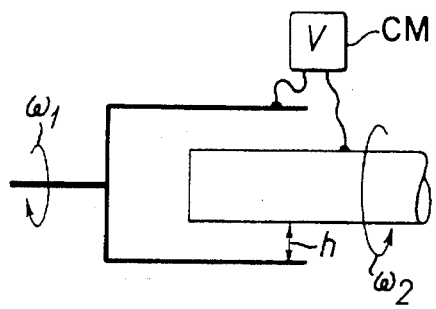

United States Patent
Bullough et al.

Patent Number: 5,524,743
Date of Patent: Jun. 11, 1996

[54] QUICK-ACTING DRIVE DEVICES

[75] Inventors: William A. Bullough, Barnsley; Riazallah Firoozian, Sheffield; Ahmad Hosseini-Sianaki, Sheffield; Andrew R. Johnson, Sheffield; John Makin, Rotherham; Shi Xiao, Sheffield, all of England

[73] Assignee: British Technology Group Ltd., London, England

[21] Appl. No.: 359,084

[22] Filed: Dec. 14, 1994

Related U.S. Application Data

[63] Continuation of Ser. No. 94,030, filed as PCT/GB92/00138 Jan. 24, 1992 published as WO92/13209, abandoned.

[30] Foreign Application Priority Data

Jan. 24, 1991 [GB] United Kingdom .................. 9101577

[51] Int. Cl.⁶ ..................................................... F16D 37/00
[52] U.S. Cl. ............................................................. 192/21.5
[58] Field of Search ................................. 192/21.5, 84 E; 188/266

[56] References Cited

U.S. PATENT DOCUMENTS

| | | | |
|---|---|---|---|
| 3,144,921 | 8/1964 | Martinek | 192/21.5 |
| 3,147,835 | 9/1964 | Thomas | 192/21.5 X |
| 3,150,678 | 9/1964 | Nuber | 192/21.5 X |
| 3,266,606 | 8/1966 | Barrett | 192/21.5 |
| 3,373,355 | 3/1968 | Klass et al. | 192/21.5 X |
| 3,390,313 | 6/1968 | Peck | 192/21.5 X |
| 4,033,892 | 7/1977 | Stangroom . | |
| 4,444,298 | 4/1984 | Stangroom | 192/21.5 |
| 4,664,236 | 5/1987 | Stangroom | 192/21.5 X |
| 5,007,303 | 4/1991 | Okuzumi | 192/21.5 X |
| 5,054,593 | 10/1991 | Carlson | 192/21.5 |
| 5,123,348 | 6/1992 | Henson | 192/21.5 X |

FOREIGN PATENT DOCUMENTS

| | | |
|---|---|---|
| 0178078 | 4/1986 | European Pat. Off. . |
| 2277871 | 2/1976 | France . |
| 1070353 | 1/1984 | U.S.S.R. . |
| 985827 | 3/1965 | United Kingdom . |
| 2189086 | 10/1987 | United Kingdom . |

Primary Examiner—Rodney H. Bonck
Attorney, Agent, or Firm—Cushman, Darby & Cushman

[57] ABSTRACT

A selectively-operable drive device for drive action including a drive input member to put drive into the device, a drive output member to supply drive action from the device, the input and output members being electrically isolatingly spaced, the device being selectively operable to put the input member and output member into driving relation by electric field electrodes on the input and output members and between the spaced members a quantity of electric field responsive fluid subject, on energisation in operation, to an electric field between the electrodes, the output member being of material of lower density than the input member and the output member having a lower mechanical time constant than the input member.

16 Claims, 4 Drawing Sheets

QUICK-ACTING DRIVE DEVICES

This is a continuation of application Ser. No. 08/094,030, filed as PCT/GB90/00138 Jan. 24, 1992 published as WO92/13209, which was abandoned upon the filing hereof.

This invention relates to the selective driving of a driven member by a driving member and to achieving such selective driving as quickly as possible. "Drive" used herein includes disconnection and braking actions as well as a connection action.

In many technologies there is a need to move an element quickly with as small a drive as possible. For example in weaving many techniques have been tried for moving selected ones of the heddles, through which the lengthwise (warp) yarns are threaded, between each pass of the crosswise (weft) yarn to vary the pattern on the woven cloth. However the closeness of the heddles and the required speed of operation often lead to overheating of the drives and this shortcoming means that there is still need for improvement, whether direct-acting selectively energised drives or selectively operated clutches or brakes or the like are used. Rotational drives face similar problems. Despite the intensive development of devices such as servo and stepper motors and controllable fast solenoids these are still essentially electromagnetic and can not meet the requirement for rapid response at significant force levels and, often, a "shaped" response of specific form.

If electromagnetic techniques are used for drive devices the nature of the magnetic materials needed, for example weight and eddy current losses, slows the speed of operation and can cause excessive heating, while the windings have significant L/R time constants and $I^2R$ losses as well as significant current surge on switching.

It is an object of the present invention to provide a quick-acting drive device which avoids these and other shortcomings of magnetic devices.

According to the present invention there is provided a selectively-operable drive device for drive action as hereinbefore defined including a drive input member to put drive into the device, a drive output member to supply drive action from the device, the input and output members being electrically isolatingly spaced, and means selectively operable to put the input member and output member into driving relation including electric field electrodes on the input and output members and between said spaced members a quantity of electric field responsive fluid subject, on energisation in operation, to an electric field between said electrodes, the output member being of material of lower density than the input member and the output member having a lower mechanical time constant than the input member.

Such an output member minimises inertia and aids speedy pick-up. The electrode on the output member may be a light conductive cover. The output member may be of cup or other shell form to reduce moment of inertia. The cup or shell form may be of metal. The material for the output member may be a plastics or other lightweight material. The electrode may be itself of a conductive plastics material. The plastic electrode may be on a plastics output member. The output member may be closely fitted into but spaced within said input member.

Conveniently in operation the input member is driven all the time and the electrodes selectively energised to link the output member to the input member by stiffening of the electrotheological fluid.

The fluid may be an electrotheological fluid or other hydraulic semiconductor having a force transmitting electric field response, such as liquid crystals and synthetic polarizable molecules.

The device may include control means selectively operable to electrify the electrodes and fluid and to remove electrification of the electrodes and fluid. The control means may be selectively operable to provide a required drive take-up or braking characteristic with time. The control may be predetermined or dynamic.

Preferably the input member is driven by a motor run continuously and having a moving part, such as a rotor, connected to the input member to provide substantial inertia (stored energy) at the input member.

Figure 2:
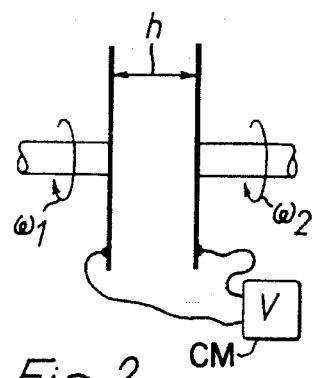
Figure 3:
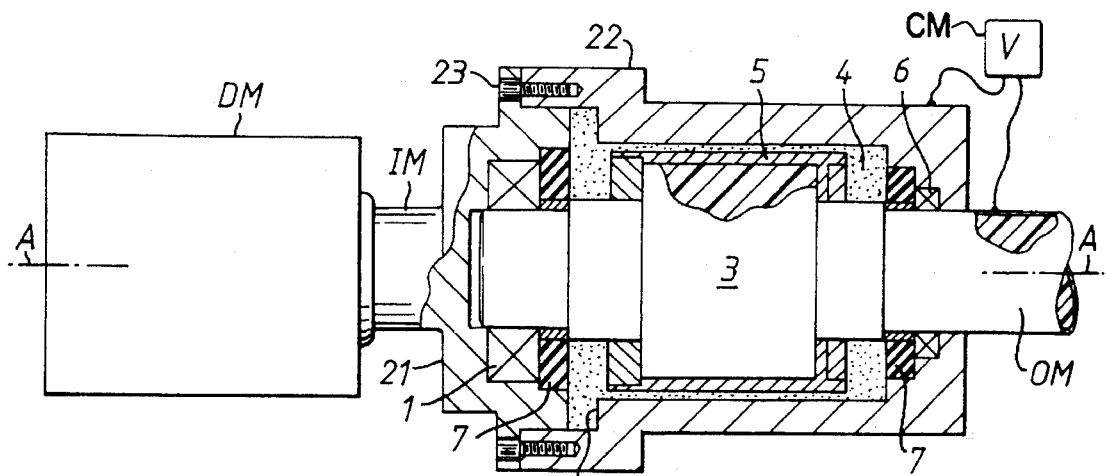

Embodiments of the invention will now be described with reference to the accompanying drawings in which:

FIGS. 1 and 2 show in schematic form two selectively operable quick-acting drive devices according to the invention, FIG. 3 is a section through a drive device according to the invention, and FIGS. 4 to 10 are graphs useful in understanding the invention.

FIGS. 1 and 2 show, schematically, respectively a drive device of cup form and of plate form. Both these forms, as well as other forms, are appropriate for the present invention subject to their inherent characteristics, known to those skilled in the art. In each the input member is driven, preferably continuously, at a rotational speed $\omega_1$ and the lower inertia output member, when selectively connected to the input member, at a rotational speed $\omega_2$ which increases to a value equal to $\omega_1$ at "lock" of the drive device. A voltage V is selectively applicable across a gap h containing an electric field responsive fluid to stiffen the fluid and provide a drive connection.

FIG. 3 is a section through an actual drive device, essentially a clutch of cup form, embodying the invention.

A rotational driving means, DM, of any convenient form, is attached to an input member generally indicated at IM. An output member, from which drive can be taken, is generally indicated at OM. Conveniently these members are shafts along one axis (A—A) and the output member is supported inside the input member spaced therefrom for free rotation with respect thereto by bearings 1 and 6. The input member may be of two metal parts 21,22, assembled around the output member and held together by fasteners 23 to hold the output member therein. Suitable shoulders on the output member position it in the input member at the bearings 1 and 6. The input member is rotatable with the driving means. All the elements described are arranged and supported for smooth rotation on the axis A—A. Oil seals 7, for example of VITON (RTM), are provided at the bearings. Alternatively a seal based on an ER fluid and a labyrinth may be used although shear effects can cause some leakage through a labyrinth seal. Compatibility of the fluids, seals and other materials is needed. Bearing 1 is conveniently a roller bearing and bearing 6 conveniently a ball bearing. The output member includes a rotor 3 to be driven by the part 22 of the input member. The rotor 3 is of plastic in this embodiment and has a surface 5 in the form of a metallic electrode. The relative sizes of the input and output members are such that there Is gap 4 between the electrode 5 and the inner surface of part 22. The construction described for the output member uses material of lower density (plastic) than the input member (metal) and in a thin-shell form to produce a much lower inertia in the output device than the input device. It is an important feature that this difference in moments of inertia exists so that rapid pick-up of output member speed can be produced. The output member can be wholly of plastic, a conducting plastic being usable for electrode 5.

Electrorheological or other hydraulic semiconductor fluid of a suitable type is in gap 4. Respective electrical connections (not shown in detail) are provided to surface 5 and the inner surface of part 22. Conveniently the connection to surface 5 includes a slip-ring to carry the high voltage needed for the control of an electrorheological fluid. The slip-ring, connection and respective electrode can be produced in one action as an integral layer, for example by evaporation or electroplating or other methods. In another arrangement the connection is a wire through a bore along the axis of the output member. The connection to part 22 can be by continuity through metallic parts such as shaft supports.

The dimensions of a drive device embodying the invention and having the form described by FIG. 3 are about 60 millimetre length by 60 millimetre diameter for the rotor 3, with the gap 4 at 0.5 millimetres for a 2 Nm rating device. The gap can be in the range 0.25 millimetre to 1.0 millimetre, as appropriate to a particular arrangement.

Clearly other constructions, for example with the driven member around the drive member or of linear or other form can be used. Also for braking the low inertia output member could itself cooperate with a further, fixed, element through an electric field responsive fluid as above. Two or more members may be selectively connected by a single low inertia member, for example to synchronise one or more of the selectively connectable members.

A power supply is needed for the high voltage used to control the electrorheological fluid, providing a control means exemplified at CM for selectively electrifying the electrodes and fluid and removing electrification therefrom. Estimates of the electrical characteristics of the above device from ER valves indicate that for such devices the capacitance is some five to ten nanofarads and the resistance some 360 to 480 kilohms. These values are likely to vary with the type of fluid used but the product (the RC time constant) may be substantially constant even if the geometry changes. A voltage of up to about two thousand volts of appropriate polarity is needed to give an appropriate potential gradient across the half-millimetre gap 4, that is variable up to about 4000 volts/millimetre subject to the fluid used.

Typically a potential gradient of 4000 volts/millimetre is used across gap 4. Subject to fluid type used in the gap other potential gradients and specific polarity may be used. A range of values of half to one millimetre for the gap are appropriate for the embodiments described here but clearly other values are appropriate for other embodiments. It has been found that the performance of devices as described above is substantially constant if the voltage is adjusted to maintain a substantially constant potential gradient for different gap sizes.

One or more of a steady potential an alternating potential and a combination of such potentials may be used. Step changes or pulses of voltage can be useful because of time-related effects in the fluid. A frequent reversal of the potential across the gap reduces the possibility of migration of fluid material in the electric field. One useful form of potential is pulses of opposite potential, spaced in some cases by long periods of zero potential.

The gap size can have some influence on the performance and at high shear rates, for a given field strength, an increased gap can increase the output torque. Thus, with a maintained potential gradient, a gap of three-quarters to one millimetre may be preferable. The delay t* (see below) does not significantly vary with gap size.

A test set-up for the drive device can include a variable speed motor to provide the drive means, a dynamic torque transducer and powder brake dynamometer all connected by suitable torsionally stiff flexible couplings. Tachometers and other instrumentation can be provided in known manner.

The device as shown in FIG. 3 can be used in any orientation as the electrorheological fluid is contained by the seals. If a device for vertical use is required then seals are not needed as the input member IM can have the form of a cup and can be arranged with the closed bottom (part 21) downwards and the open mouth upwards. In this arrangement electrorheological fluid placed in the cup around the output member OM will remain in place. Losses can be replaced by "topping-up" at the open mouth. If required a cover, which need not be a complete seal, can be provided at the open mouth of the cup. In another form of a device for vertical use the outboard end of input member part 22 can be provided with apertures through which electrorheological fluid can be introduced. This arrangement can also provide a support for a bearing for the shaft of the output member. Slip ring connections can of course be avoided. For example the support for bearing 6 can be arranged to be electrically isolated from the rest of part 22 or its equivalent and form an electrical connection to motor 3 through the bearing, avoiding the need for a slip ring. Care is needed that the electrical energisation does not damage the bearing. The space between part 21 and the rotor 3 can provide a reservoir of fluid.

In some conditions it is found that after prolonged use the electrorheological fluid can be caused to separate so that a "sludge" of particulate material is produced. If there are outward facing recesses, such as that indicated at 24, the sludge can accumulate. While this may appear to be an advantage the fluid performance can be degraded by this separation and in general outward facing recesses are undesirable as encouraging such degrading separation.

Figure 8:
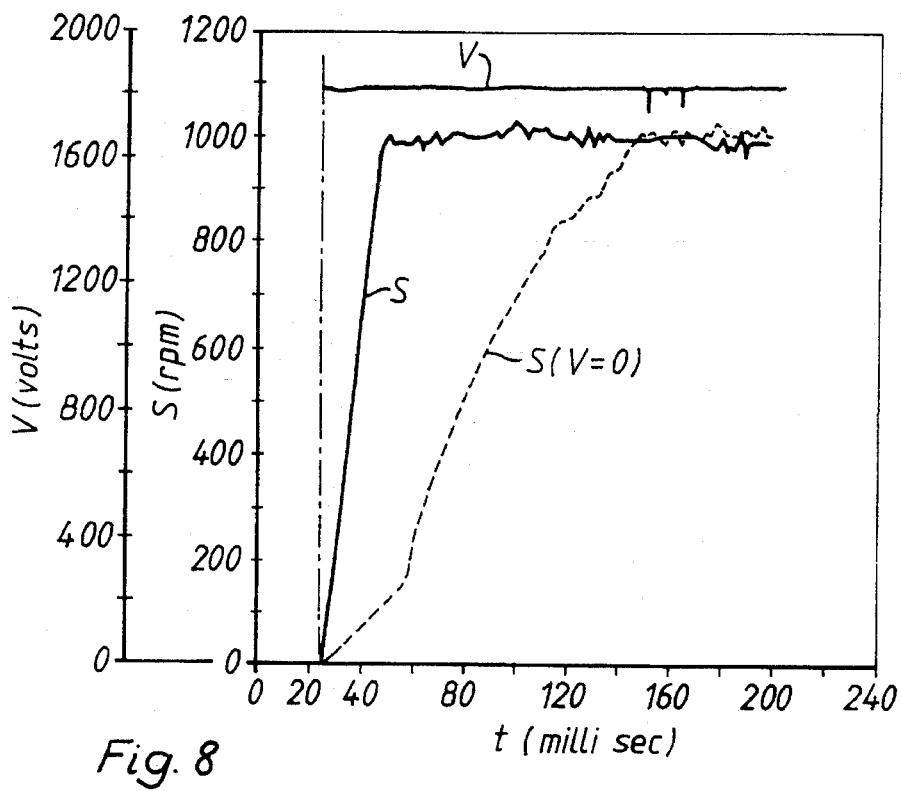
Figure 9:
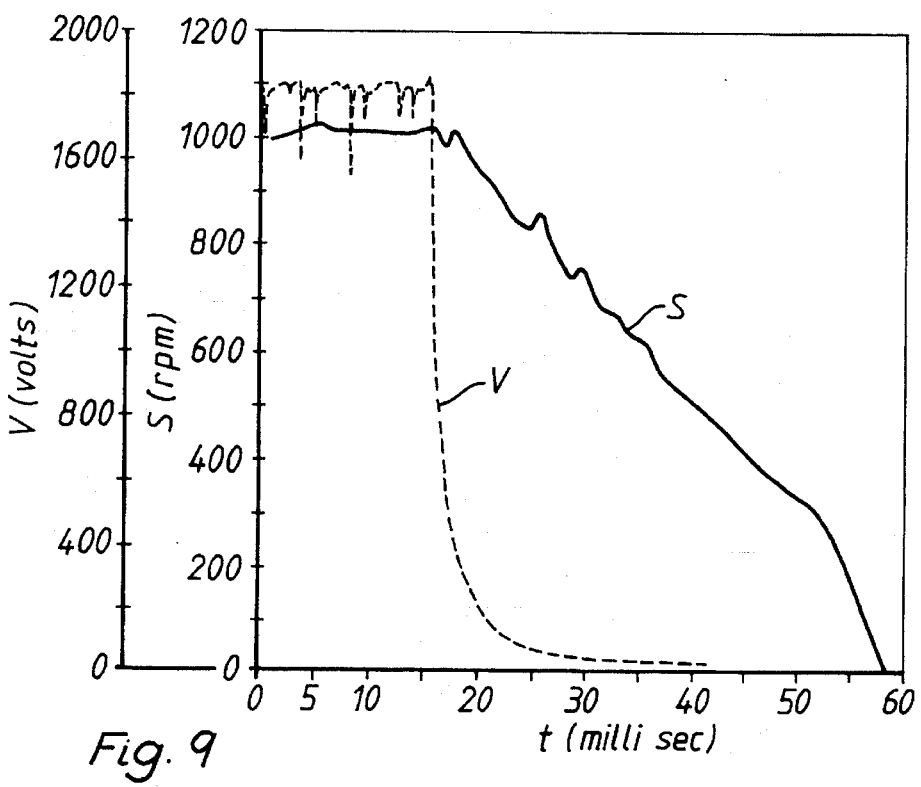

The graphs in FIGS. 8 and 9 indicate the results of tests in this set-up using a fluid of 30% volume fraction moist lithium polymethacrylate solid in dielectric liquid as the electrorheological fluid. Other fluids may be used with appropriate changes, as known in the art. No load was applied in these tests. FIG. 8 indicates the rise in output speed (S) when voltage V is applied to bring the fluid into action. The time for S(V=0) is for drag or friction in the absence of energisation. FIG. 9 indicates the fall in output speed (S) when voltage V is switched off, although here the voltage does not fall rapidly enough to zero. This indicates that the source impedance and other parameters of the power supply as well as the connection impedance are significant in achieving rapid performance but these requirements are readily met by those skilled in the art.

In many applications of the drive device the drive means DM and input member IM will run all the time with the electrorheological fluid being brought into action when an output drive is required.

The operational requirements and performance will depend on the structure of the device and the fluid used. For clutches of about one to five Newton metre capacities the fluid mentioned above is suitable, although an increase of solid volume fraction to 40% is possible. Although viscosity then increases this may be reduced again by modifying the dielectric fluid viscosity as lubrication demands are unlikely to be high where there is not any sliding contact. The yield stress of the fluids are from two to three koloPascals to above 10 kiloPascals, at a maximum potential gradient of up to some four kilovolts per millimetre. Viscosity from about twenty to over one hundred milliPascal seconds is acceptable.

Figure 10:
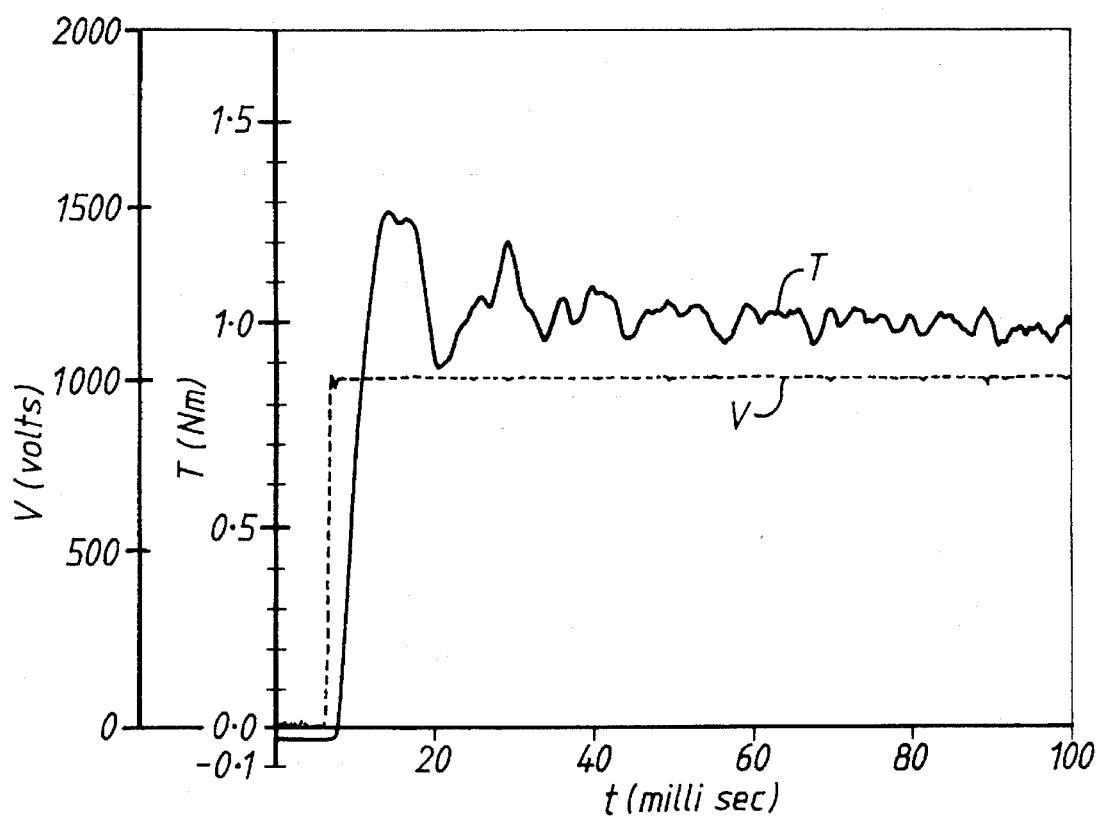

FIG. 10 shows the measurement of torque on applying a voltage to the device. The rise time for torque after the voltage becomes effective is around 900 to 1000 microseconds. The torque was measured using a force transducer on the shaft of the output member OM. The measurement was made with a shaft speed of about 100 rpm and 1000 volts across a quarter millimetre gap. The test result shows the very advantageous performance achieved by a device according to the invention.

Figure 4:
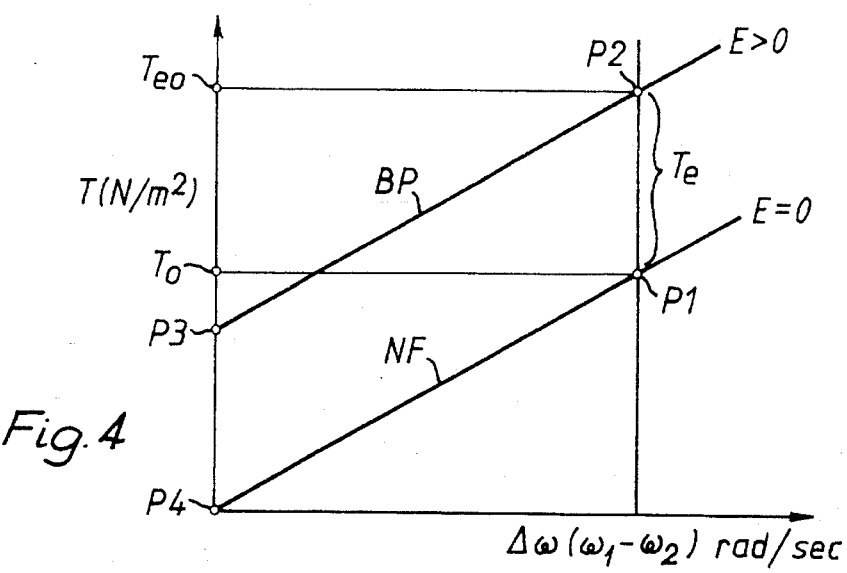

FIG. 4 shows in idealised form some theoretical conclusions in the form of a diagram of torque against angular velocity difference when the electrorheological fluid is assumed to behave as a Bingham plastic (BP) when an electric potential gradient is present and as a Newtonian fluid (NF) in the absence of such a potential gradient. One significant design feature is to have sensibly constant voltage and velocity gradients across the gap containing the electrorheological fluid. Advantageously the voltage gradient is constant to reduce risk of dielectric breakdown and the velocity gradient is constant to produce a characteristic akin to the E>0 one of FIG. 4. Cooling needs may also have to be borne in mind, for example circulation of the fluid through an external heat exchanger is useful where the clutch is of the FIG. 2 type. Cooling may particularly be needed for the inner member when there is a speed difference across the device.

The resulting performance is seen to be significantly better than an electromagnetic device. Pick-up times of less than ten milliseconds to some twenty milliseconds are readily achieved, compared with two hundred milliseconds for a conventional armature controlled permanent magnet motor and fifty milliseconds for the much more expensive rare earth magnet device at one kilowatt and 1000 r.p.m., assuming that the coils and magnets are capable of operating at the full permitted torque, which is much greater than the steady torque rating, during the whole "run up" time.

An analysis based on FIG. 4 is as follows:

Consider the pick-up of the clutch of FIG. 1 from point P1 ($\omega_2=0$) via P2 to point P3 ($\omega_2=\omega_1$) of its characteristic, FIG. 4, in which torque (T) is shown against difference in rotation ($\Delta\omega$). Assume that $\omega_1$ is constant and that the lines of constant voltage/field are parallel at E=0 and E>0. $T_o$ is the total friction (torque) from viscous action at point P1, other frictional sources are neglected. $T_{eo}$ is the total torque suddenly achieved at P2 after an electron-hydraulic time delay of t* following the triggering of the excitation. Also the rotor is taken not to move or accelerate during t*.

At any time t after t*, therefore, $T_{eo} = I_2 \alpha_2$.

If the viscous friction is made so small that it can be neglected and the driven rotor, inertia $I_2$, is accelerated at $\alpha_2$, as the load moves from P2 ($\omega_2=0$) to P3 ($\omega_2=\omega_1 1$):

$$T_e = I_2 \alpha_2, \quad [1]$$

$$\alpha_2 \text{ is constant, and } \omega_2(t) = \omega_2 + \alpha_2 t. \quad [2]$$

Given that the driven rotor is held stationary at P1 then $\omega_2=0$ and $\omega_2(t)=\alpha_2 t$. Thus the point P3 is reached at $t^{} = \omega_1/\alpha_2$. Substituting this into the primary equation gives the run up time $t^{}: \omega_1 \cdot I_2/T_e$ i.e. when $\omega_1 = \omega_2$. The total time for pick up following the trigger is thus $t^*+t^{**}$. Te can be dependent on the time taken to build the voltage across the gap and also on the temperature and history of the fluid.

Theoretically given a value for Te of 10 Nm and a speed (effectively $\omega_2$) of 1000 rpm (using round figures and assuming an electro-hydraulic time constant t* of 1 msec or less):

$$t^*+t^{**} = 1\times10^{-3} + 2\pi\ 1000\ I_2/600. \quad [3]$$

Briefly: t*<<L/R of electromagnetic device, t**<<Than for electromagnetic device inherently of heavy material.

For a hollow plastic rotor with a very thin electrode on its surface, with L=D=60 mm and an I2 value therefore of say $10\times10^{-5}$ kg m$^2$ this gives an overall rise time of about 2 msec. Indeed given that friction and viscous drag must be present the run up time will be even shorter. However, for reasons of efficiency and heating the parasitic drag should be kept small. Even so an ER brake used In tandem (as mentioned above) with the catch would effect a fast start and arrest mechanism. It would also be speeded in action by the uncontrollable friction content of the clutch of the tandem brake. Run up performance at other conditions can easily be estimated by multiplying the above results by the ratio of speed, inertias or torques with the midrange values selected for the above assessment.

The results of tests are in adequate agreement with the above analysis and are given in Tables 1 and 2.

Other forms of rotor are possible, for example a light, i.e. thin, metal shell, or a light relatively strong wood such as balsa. For balsa wood a conductive surface, such as metallic paint, has to be provided. A plastic, such as "blue" polystyrene (a non-beaded foam), may be shaped and then stiffened and given a conductive surface. A Langmuir-Blodgett film may be used. A particularly suitable form of rotor is of plastic with a conductive plastic peripheral layer as electrode 5. This achieves a lower inertia and low mass rotor of low density. The rotor may be hollow.

Figure 5:
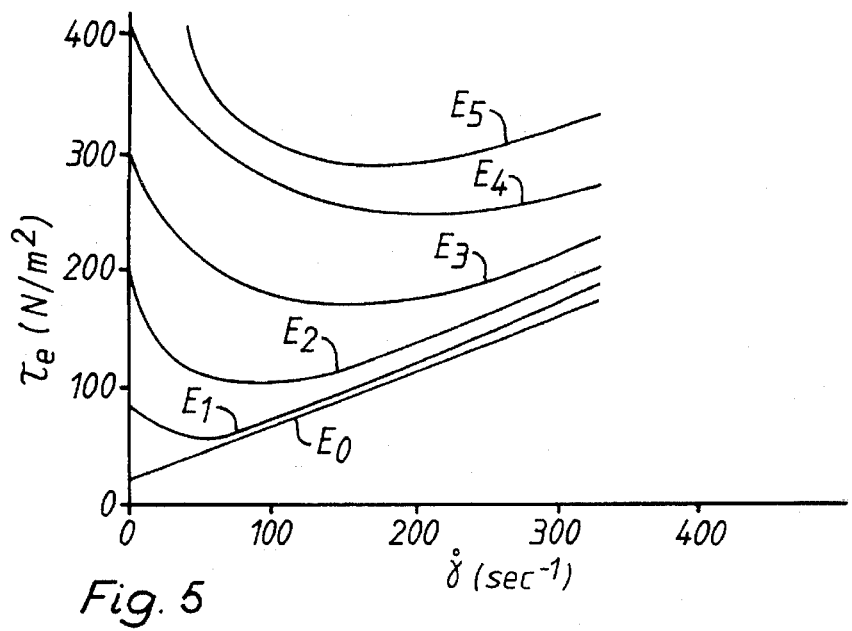
Figure 6:
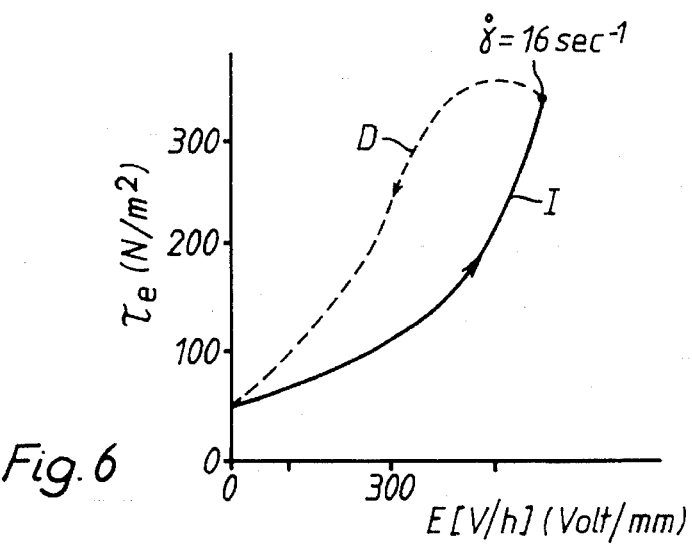
Figure 7:
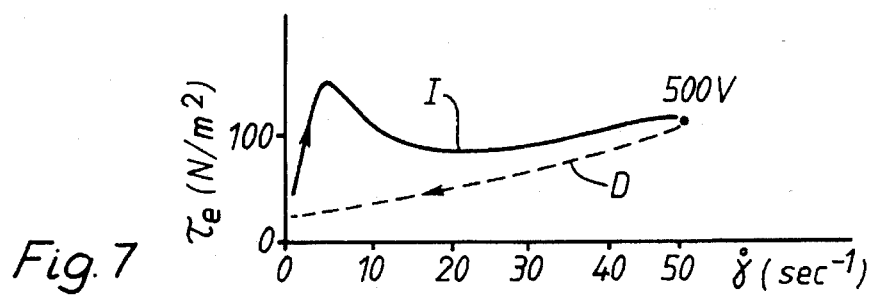

FIGS. 5, 6 and 7 are from publications. FIG. 5 shows a kinematic shear test with torque T constant shear rate $\gamma$ for electric field intensity values $E_1=0.64$ kv/mm, $E_2=1.27$ kv/mm, $E_3=1.86$ kv/mm, $E_4=2.54$ kv/mm and $E_5=3.18$ kv/mm. FIGS. 6 and 7 show pseudo-hysteresis shear stress $\tau_e$ versus electric field intensity E with its increase (I) and decrease (D) for an electrotheological fluid at 16 sec$^{-1}$ and similarly for shear stress $\tau_e$ versus shear rate $\gamma$. FIG. 5 is for a starch and oil fluid, FIGS. 6 and 7 for diomite and oil.

FIGS. 8 and 9 are transient behaviour on pick up and drop of load of a drive-connection embodying the invention, showing speed S against applied voltage V for a constant torque load. The history of fluid use can affect such results, e.g. the yield stress and zero volts viscosity can be affected by previous field or shear applications.

Tables 1 and 2 show that test results are in good agreement (20% or better) with the values estimated from equations [1] to [3] with some allowance for seal/bearing and viscous friction losses. Table 2 shows that $T_e$ (FIG. 4) is little affected by practical rotor speeds but that torque and settling speed are voltage dependent. The brake torque for Table 2 was close to the maximum torque transmittable without slip, while similar results are obtained at loads up to five times rotor inertia.

The techniques described above are of embodiments of an invention which provide a quick-acting drive connection and are by way of example only. Details and variations for specific purposes will be apparent to those skilled in the art. Several advantages arise from the use of an electrotheological coupling medium made effectively solid in very short times when required and having the driven element of low inertia and low density construction. Clearly the speed of response, on drive or braking, is a valuable advantage. This response can have a time delay t* for the engagement of full rated torque of 900 microseconds or less. Also the liquid coupling provides "shock load" capability and cooling action, with circulation of liquid if needed. This circulation can be through a hollow output part 3. The large energy storage of an electromagnetic circuit, with associated electrical power handling problems is avoided by the use of a capacitative arrangement. The rapid braking action is very useful for stepping and servo motors and like positioning devices where precise, rapid motor position control is needed, particularly when many devices are used in a small space.

Clearly multiple arrangements of devices according to the invention are possible, as will be apparent to those skilled in the art. The device may also be in the form of a plate or other conventional clutch or drive device, with appropriate arrangements apparent to those skilled in the art.

Furthermore the controllability of the behaviour of the device permits the "shaping" of the action to produce a particular drive or brake characteristic. Even dynamic shaping is possible, using parameter $\tau_e$ for example which is rapidly voltage dependent. Such shaping can be produced in low power electronic signal processing circuits and used to drive power electronics circuits connected to the device. In contrast L/R devices such as electromagnetic clutches and brakes cannot easily be controlled to a selected characteristic.

TABLE 1

Acceleration Tests

| VOLTAGE STEP "ON" (Volts) | LOAD | SPEED CHANGE (rpm) | TOTAL TIME FOR ACCELERATION t* +t** (millisec) | TEMPERATURE θ °C. |
| --- | --- | --- | --- | --- |
| Viscous Drag only | 0 | 1000 | 121 | 27.5 |
| 1200 | 0 | 1000 | 44.6 | 28.5 |
| 1600 | 0 | 1000 | 29 | 29.5 |
| 1800 | 0 | 1000 | 24 | 21.5 |
| 0 | 0 | 2000 | 185 | 27.5 |
| 1800 | 0 | 2000 | 49.5 | 25 |

TABLE 2

Deceleration Tests

| VOLTAGE STEP "OFF" (Volts) | LOAD TORQUE (Non-Steady) (Nm) | SPEED CHANGE (rpm) | TOTAL TIME FOR DECELERATION (millisec) | TEMPERATURE θ °C. |
| --- | --- | --- | --- | --- |
| 0 | 0.92 | 1000 | — | 23 |
| 1200 | 1.7 | 1000 | 81 | 26 |
| 1600 | 2.12 | 1000 | 56 | 27 |
| 1800 | 2.41 | 1000 | 43 | 29.5 |
| 0 | 0.78 | 500 | — | 22 |
| 1800 | 2.5 | 500 | 19.6 | 25 |

We claim:

1. A selectively-operable drive device for drive action comprising
    a drive input member to put drive into the device,
    a drive output member to supply drive action from the device, the input and output members being electrically isolatingly spaced, and
    means selectively operable for putting the input member and output member into driving relation including respective electric field electrodes on the input and output members and between said spaced members a quantity of electric field responsive liquid, subjected to an electric field between said electrodes during operation of the drive device,
    the output member being of a material of lower density than the input member and the output member having a lower mechanical time constant than the input member,
    wherein at least one of said electrodes is composed of a conductive plastics material.

2. A device according to claim 1 in which the electrode on the output member is a lightweight conductive cover.

3. A device according to claim 1 in which the output member is of cup or other shell form to reduce moment of inertia.

4. A device according to claim 1 in which the material for the output member is a plastics or other lightweight material.

5. The device according to claim 1 in which said output member is composed of plastics material and said at least one plastic electrode is disposed on said plastics output member.

6. A device according to claim 1 in which the output member is closely fitted into but spaced within said input member.

7. A device according to claim 1 in which the input member is of cup form.

8. A device according to claim 1 in which the input member and the output member are of plate form.

9. A device according to claim 1 in which, in operation, the input member is driven all the time and the electrodes selectively energised to link the output member to the input member by stiffening of the electrotheological fluid.

10. A device according to claim 1 in which the fluid is an electrorheological fluid or other hydraulic semiconductor having a force transmitting electric field response.

11. A device according to claim 10 in which the hydraulic semiconductor is selected from the group consisting of liquid crystals and synthetic polarizable molecules.

12. A device according to claim 1 in which the device includes control means selectively operable to electrify the electrodes and fluid and to remove electrification of the electrodes and fluid.

13. A device according to claim 12 in which the control means is selectively operable to provide a required drive take-up or braking characteristic with time.

14. A device according to claim 12 in which the control means is predetermined to operate at predetermined conditions or dynamic to operate in dependence on an external varying indication.

15. A device according to claim 1 in which the input member is driven by a motor run continuously and having a moving part connected to the input member to provide substantial inertia (stored energy) at the input member.

16. A device according to claim 15, in which the moving part is a rotor.

* * * * *